May 20, 1952 — R. J. BRASKI ET AL — 2,597,695
COOKING UTENSIL

Filed May 3, 1951 — 5 Sheets-Sheet 1

INVENTORS.
Raymond J. Braski,
Fred C. Schwaneke,

May 20, 1952 R. J. BRASKI ET AL 2,597,695
COOKING UTENSIL
Filed May 3, 1951 5 Sheets-Sheet 2

INVENTORS.
Raymond J. Braski,
BY Fred C. Schwaneke,

INVENTORS.
Raymond J. Braski,
Fred C. Schwaneke

May 20, 1952 R. J. BRASKI ET AL 2,597,695
COOKING UTENSIL

Filed May 3, 1951 5 Sheets-Sheet 5

Inventors:
Raymond J. Braski
Fred Schwaneke
By: Watson W. Harbaugh
Atty

Patented May 20, 1952

2,597,695

UNITED STATES PATENT OFFICE 2,597,695

COOKING UTENSIL

Raymond J. Braski and Fred C. Schwaneke, Chicago, Ill., assignors to Dormeyer Corporation, Chicago, Ill., a corporation of Illinois Application May 3, 1951, Serial No. 224,334

20 Claims. (Cl. 219—44)

This invention relates to cooking utensils and particularly to a device for cooking food in hot oils, fats or water and constitutes a continuation in part of our application Serial No. 159,572, filed May 2, 1950, now abandoned, for a Cooking Utensil, reference to and incorporation of the description and drawings of said application being hereby incorporated in this application.

Heretofore a great deal of difficulty has been experienced with devices such as deep fat fryers in maintaining an even temperature so that cooking time and results can be standardized. Not only is the hot fat cooled down greatly when loaded with a cold charge of food but the heat recovery is very slow. Not only this, but even when heat loss is recovered or the fryers are operating upon standby service, the temperature of the fat varies over a wide range.

Furthermore, the warm-up period is quite long, and draining the hot fat after use is confronted with many problems, particularly when the vessel is tipped for that purpose. When tipped, hot fat comes in contact with hot metal edges when leaving the vessel, and if any particles or damp crumbs are clinging to the edges, the fat sputters and may cause burns, with accompanying danger of dropping the vessel.

One of the objects of the present invention is to eliminate these difficulties and provide a device which not only maintains cooking oil or fat within a few degrees of a selected temperature, but also will maintain water just below the boiling point when used to poach eggs or do other culinary tasks of a similar nature.

A further object of the invention is to create and dispose a concentration of heat at one end of an elongated vessel remote from the location of the thermostat so that the higher heat exchange relationship at that end will force a circulation of the coolest portion of the hot fat into contact with the wall where the thermostat is located.

A further object of the invention is to accelerate the response of the thermostat in the direction of its next critical position in its cycle of operation to thereby anticipate the overrun effect of an electric heater upon the vessel and contents.

Another object of the invention is to maintain a constant and direct heat exchange contact between the metal body of a deep fat fryer and an electric heating element of large capacity without danger of "flashing" the fat.

Furthermore the prferred embodiment of the invention eliminates the danger of any grease draining to the inside of the housing of a deep fat fryer and thereby eliminates any danger of contamination of the electrical control mechanism and the danger of grease being vaporized inside the housing, igniting and causing a fire.

Additionally, the present invention is also characterized by a cleanness of construction and simplified assembly to minimize the number of joints present between the associated housing parts, yet the assembled parts are supported in a more closely integrated way as a unitary assembly, free from cracks developing which might cause openings through which grease could pass and contaminate the working mechanism or cause a fire.

A further object of the invention is to provide a combination well and outer housing wherein the edges joining each other are so constructed and arranged that inward or outward pressure upon either member with respect to the other will not displace or bend such member.

A further object of the invention is to provide an improved cover which need not be removed to observe whether or not a cooking operation is proceeding properly or completed.

A further object of the invention is to provide a cover having a low heat conductivity to preserve within the frying well a constant and uniform temperature.

A further object is to provide a cooking oil or fat handling device which settles out sediment while being drained to permit repeated use of oils or fats cleaned thereby.

A further object of the invention is to provide an improved basket support by which a full basket of food can be supported above the fat for draining.

Other objects of the invention include the construction and arrangement of parts which are easy to keep clean, simple and inexpensive to manufacture and service, easy and efficient in operation and capable of complete understanding thereof merely from observation by users not skilled mechanically, further objects being apparent from the drawings, the description relating thereto, and the appended claims.

Referring to the drawings generally.

Throughout the several views like numbers refer to like parts.

Referring now to the drawings in further detail, the embodiment of the invention shown in the drawings contemplates a substantially rectangular aluminum die cast vessel with an extra mass of metal stock bounding three sides adjacent the bottom in which mass a "Calrod" type electric heater is embedded at the time the vessel body is cast. The heater is U-shaped, and where the bends therein coincide with two adjacent corners of the vessel there is less metal stock at these points per lineal unit of heater length so that a higher heat application is concentrated at these points and in the wall between them. This concentration of heat forces convective circulation of cooled fat down along the wall remote therefrom where a thermostat is mounted on the outside as disposed in an air space where it responds to radiated heat as well as heat conducted through metal from the wall.

In the preferred embodiment of the invention, the upper edges of the casting are shaped to have an outwardly and downwardly extending flange which interlocks with the upper edge of the vertical side wall in an overlapping relationship which prevents grease or cleaning fluid from entering inside the housing.

The thermostat is an adjustable one and can be any one of a number of conventional constructions provided the bimetal member is disposed proximate to the vessel wall and at its mounted end it is placed in metal contact heat conducting relationship with the vessel wall. A mounting member shields the thermostat from the radiant heat of the wall except through a window coincident with the central portion of the thermostat.

Above the thermostat, where the infra red rays thereof may strike the bimetal, is located a bare wire glow coil connected in series with the heater. This coil causes the thermostat to anticipate the heating and cooling off effect of the heater and vessel respectively, and in conjunction with a cover of low heat conductivity maintains the temperature of the oil in the vessel at a substantially constant level.

A drain through the wall below the level of the heater permits removal of the hot fat from a cool area where the liquid is comparatively quiet and any foreign particles in the cooling oil will settle out. A self-draining recess in the end wall supports the basket in an improved manner.

Figure 4:
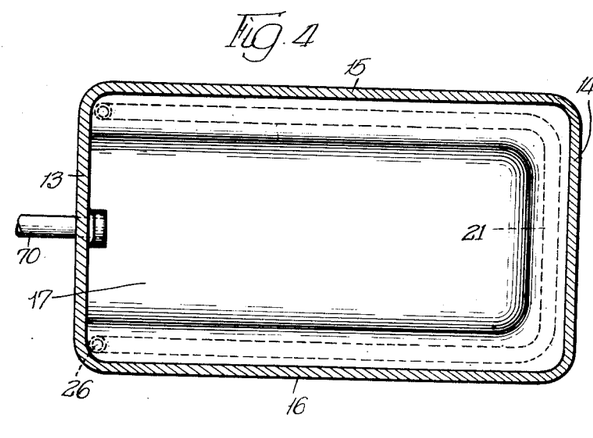
Fig. 4 is a horizontal section through the vessel member shown in the other views.
Figure 5:
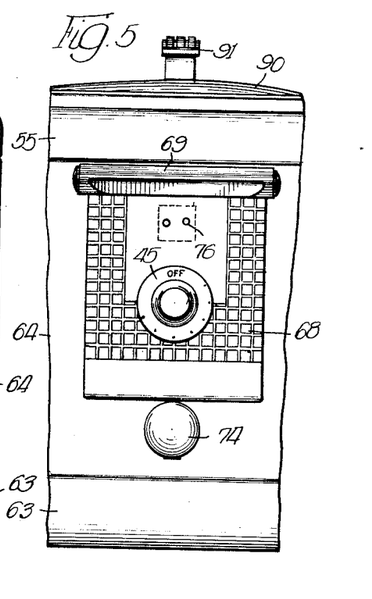
Fig. 5 is a partial end view of the device shown in Fig. 1 illustrating the control panel and elements.

The vessel comprises a unitary casting 10 preferably made of die cast aluminum. The upper edges 11 are flanged outwardly and downwardly as at 12 to terminate in an edge 12a and a bottom face 12b comprising the parting line of the dies. The vertical walls 13, 14, 15 and 16 which comprise the front end wall, the back end wall and sides, respectively, are of a cast thickness as shown and converge in a downwardly direction and are so inclined on their inside and outside faces as to provide draw tolerances for the forming dies. At their bottom edges the walls are rounded externally as at 18 into the bottom wall 17. Just above the rounded contour the inner contour of the walls are rounded inwardly to provide a mass of metal or stock as at 20 in which is embedded, as when the body is cast, a metal encased unitary heating element 21 referred to very often as a "Calrod" or "Monorod." The element 21 comprises a metal alloy tubing surrounding a heater element encased in a heat conducting electrically insulating refractory material. The extra stock 20 is provided only in walls 14, 15 and 16 (Fig. 4), leaving wall 13 of substantially uniform casting thickness throughout. Bosses 22 extending downwardly from the bottom are threaded as at 23 to receive screws therein employed to hold the assembly together in a manner hereinafter further described.

Figure 11:
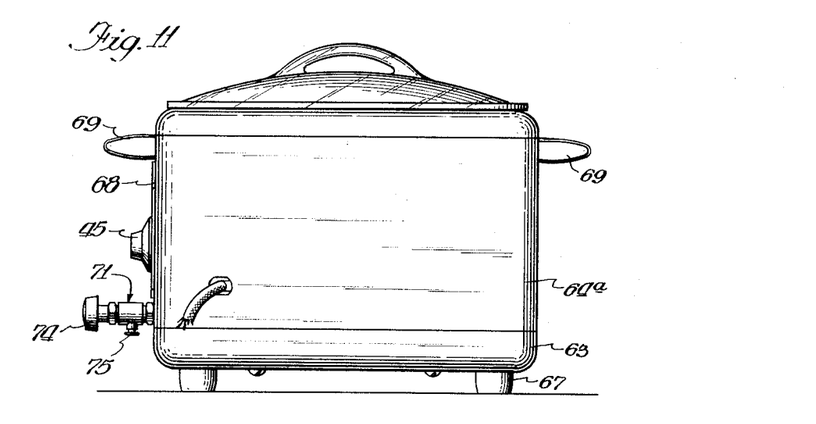
Fig. 11 is a side elevation of a cooking device embodying a preferred form of the invention.
Figure 12:
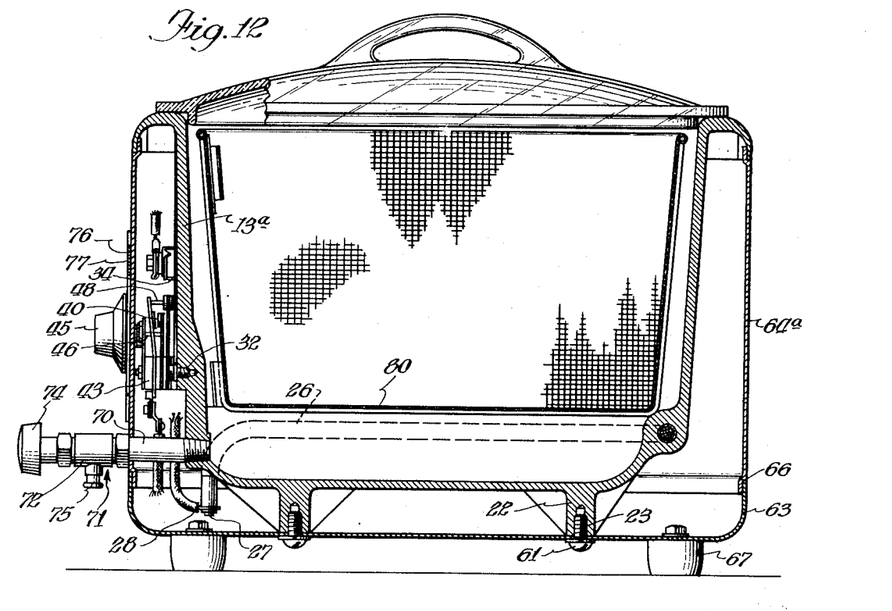
Fig. 12 is an enlarged longitudinal section of the device shown in Fig. 11.
Figure 13:
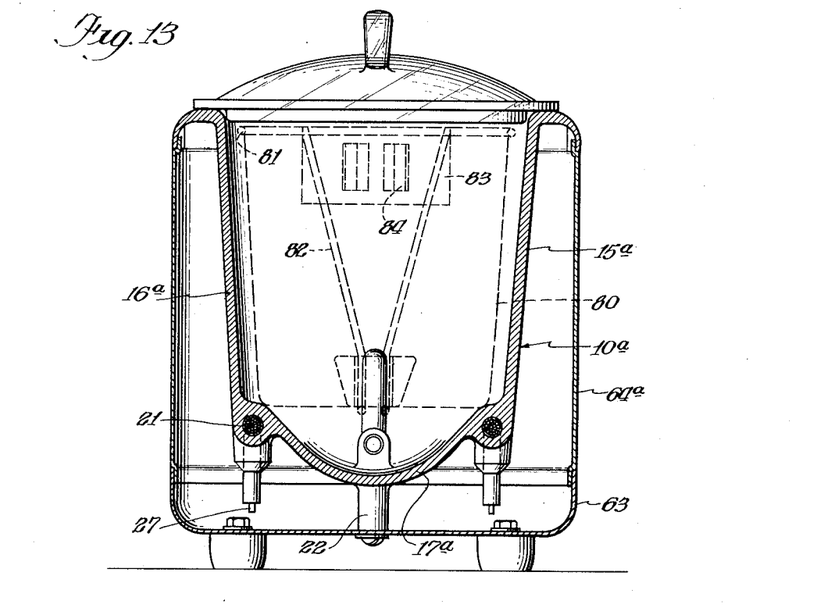
Fig. 13 is an enlarged transverse section of the device shown in Fig. 11.
Figure 14:
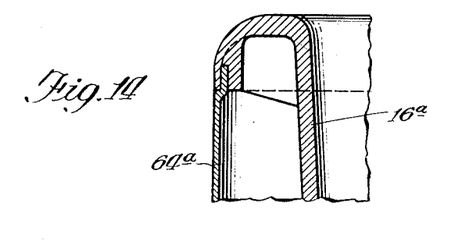
Fig. 14 is an enlarged sectional view taken from the upper left hand corner of the view shown in Fig. 13 with the cover removed.

In the preferred form shown in Fig. 11, the vessel comprises a unitary casting 10a preferably made of die cast aluminum having a slightly larger well. The upper edges 11a are flanged outwardly and rounded downwardly as at 12c to terminate in a coplanar edge 12d comprising the parting line of the dies. Behind the downwardly extending portion of the flange 12c recesses or short grooves 9 are cast in the lower face of the edge to receive the upper edges of the vertical walls as hereinafter described. The inner walls of these grooves are connected to the main portion of the vessel by reinforcing webs 9b.

The heater 21 or 21a is U-shaped as shown in a horizontal plane and is bent downwardly at the ends as at 26 so that space is saved. Furthermore, the ends of the electric element 27 have welded to them binding post eyelet members 28. Holes 30 which are left where heater locating cores were provided in the dies to hold the heater in place during casting comprise holes or openings through which it can be determined by inspection whether the heater is in proper position when the heater is turned on.

Figure 2:
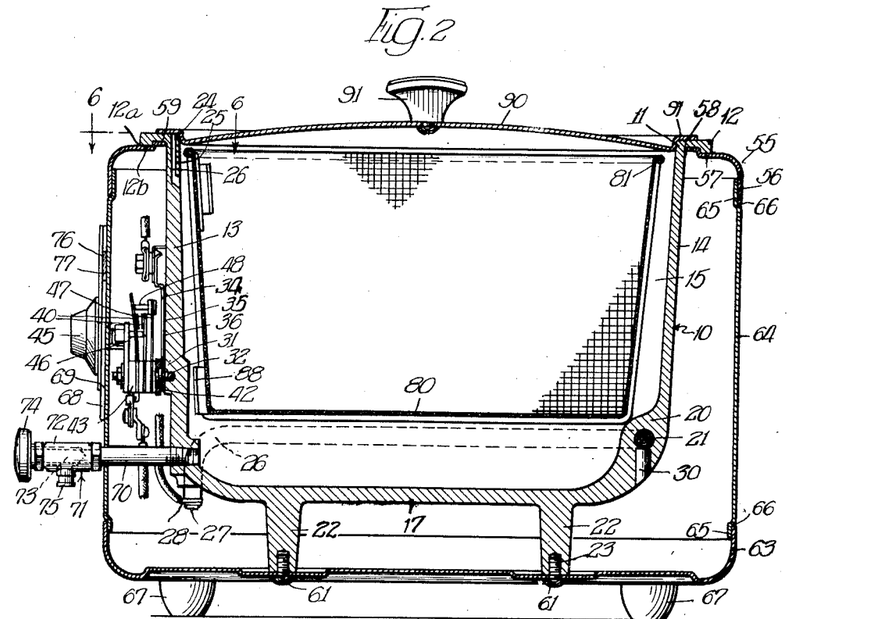
Fig. 2 is an enlarged longitudinal section of the device shown in Fig. 1.
Figure 3:
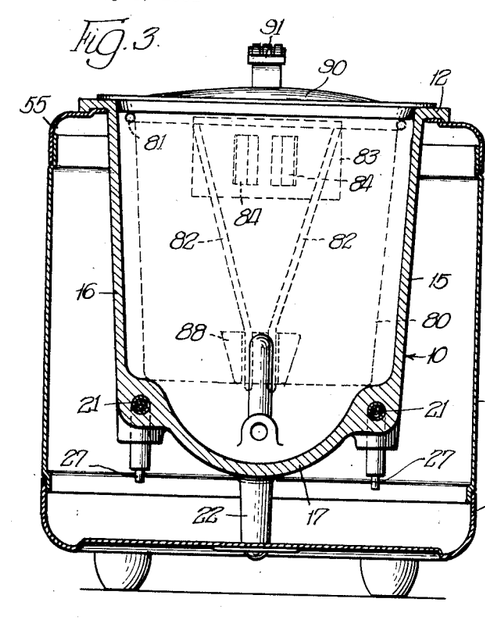
Fig. 3 is an enlarged transverse section of the device shown in Fig. 1.
Figure 6:
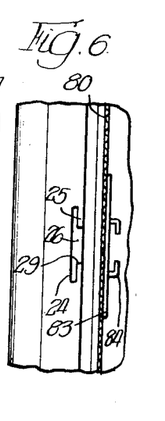
Fig. 6 is a section taken on line 6—6 of Fig. 2.
Figure 7:
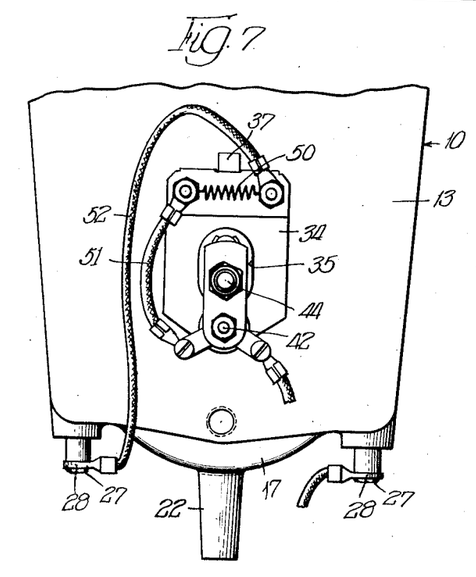
Fig. 7 is an end view of the vessel with the control elements shown which are mounted thereon.
Figure 8:
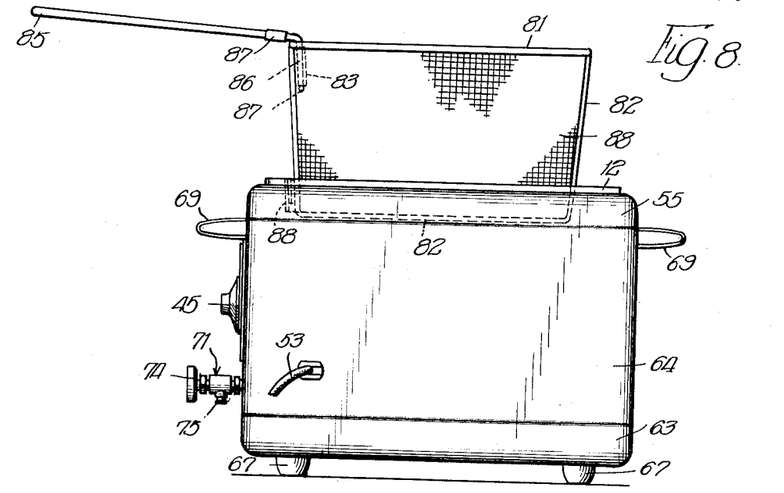
Fig. 8 is a side elevation showing the mounting of the basket for draining purposes.
Figure 9:
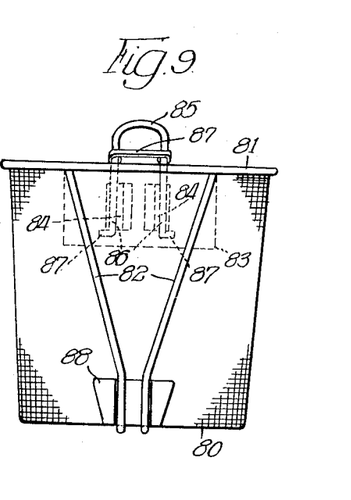
Fig. 9 is an end view of the basket and handle.
Figure 10:
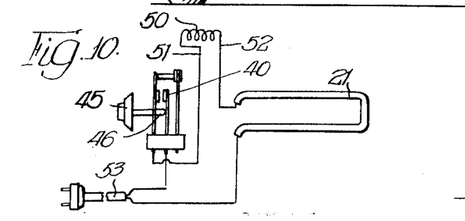
Fig. 10 is a schematic wiring diagram of the embodiment shown in Fig. 1.

The wall 13 at its upper marginal edge as also shown in Figs. 2, 3 and 6 has a recess 24 therein bounded on the opposite sides by coplanar ears 25 extending towards each other to form a T-slot 26 (Fig. 6) which drains back into the vessel at the bottom through the throat 29 of the slot.

On the outside surface of the wall 13, a boss 31 is provided as part of an elongated draw and is internally threaded to receive a stud 32 upon which is mounted a thermostat switch 33 as carried by a mounting plate 34. The mounting plate has a window 35 through the center portion to determine the area of the wall 13 which is effective upon the bimetal strip in the radiation of heat. The upper edge of the mounting plate is notched at 37 directly over the draw, of which the boss is a part, and the adjacent edges are bent toward the wall to border the draw and support the plate thereby against lateral movement.

The thermostat comprises two electrical make and break contacts 40 carried by leaf springs 41 clamped together at their base on a sleeve rivet 42 with electrical insulating washers 43 between them. The leaf springs normally urge the contacts to make contact but one of them is adjustably moved away from the other by a hand set control shaft 44 carrying a dial knob 45 having temperature indicia thereon at one end and a dielectric thrust pin 46 engaging the spring at the other end. The other spring is subjected to the deflection of the bimetal member 47 through an intermediate dielectric pin 48 carried by the bimetal.

In one position of the dial, the first spring and contact are depressed inwardly far enough to separate the two contact members under all possible conditions, and this position is utilized as the "off" position. When the dial is turned to any other predetermined position registered thereon in temperature readings, the two contacts are permitted to come together as an initial or resting position to close a circuit which includes in series therewith a glow coil 50 mounted above the thermostat and the heater 21, as connected by leads 51 and 52, which leads interconnect, respectively, one contact spring and one end of the glow coil, and the other end of the glow coil and one end of the heater 21. The other spring and the other end of the heater are connected across the house line by an extension cord 53. In this connection it should be noted that this latter spring which is connected to the house line is preferably the "hot" connection if a polarized plug is used, and this spring is located in the middle of the thermostat assembly for safety reasons.

As will be seen from the drawings, the glow coil 50 is located just above the upper end of the bimetal member 47 and is disposed where its radiation is mainly edgewise to the bimetal member 47, but where its heat effect is essentially confined to the upper portion of the bimetal while the main part of the bimetal is exposed to a window controlled breastwise radiation of heat from the wall 13. The base portion of the bimetal member is shielded from the wall 13 and receives little, if any, radiation from the glow coil. Its sensible heat is essentially that which is conducted to it through the stud 32, the sleeve 42, and the intermediate metal elements.

As the temperature of the vessel 10 mounts when the contacts 50 are closed, the temperature will approach the temperature set for the vessel by the dial, but in addition to heat conducted to it through the stud, and the heat radiation from the wall of the vessel, the thermostat receives radiated heat from the glow element whose heat is much higher than the vessel wall. This higher heat effect gives an anticipating action to the thermostat. The sum of these three heats causes the thermostat to break contact before the desired temperature is reached in the vessel and after the current is cut off the higher heat which has been concentrated in the heater itself and not yet dissipated is conducted to the surrounding stock of the vessel, thereby carrying the temperature thereof up to the desired temperature.

When the current is cut off by the thermostat opening the contacts, the glow coil cools off and its contribution of radiated heat is lost. The effective cooling of the bimetal will be accelerated ahead of that of the vessel and vessel contents, whereupon the heater is again turned on before the temperature of the vessel falls appreciably from heat loss due to cooking or radiation. This anticipating action of the thermostat is superposed upon the normalizing heat radiation effect which is continually present because of the aperture controlled radiation from the vessel wall and the heat conduction through the mounting post and sleeve. Thus over the main upper portion of its body the bimetal member is steadily exposed to radiated heat from the vessel; the mounting end absorbs only heat conducted to it remotely from the nearest portions of the heater, which absorbed heat comes from two limited concentrating areas at the near bottom corners where the heater element is bent downwardly; and the free end of the bimetal is exposed to a widely varying heat radiation effect. Flexing in the bimetal adjacent the mounting stud accomplishes wide movement of the contact driven thereby, whereas bending near the free end has a minimized effect, thus making it possible to employ a rugged glow coil element at this point for that purpose without delicate adjustment, tolerances or operation.

Figure 1:
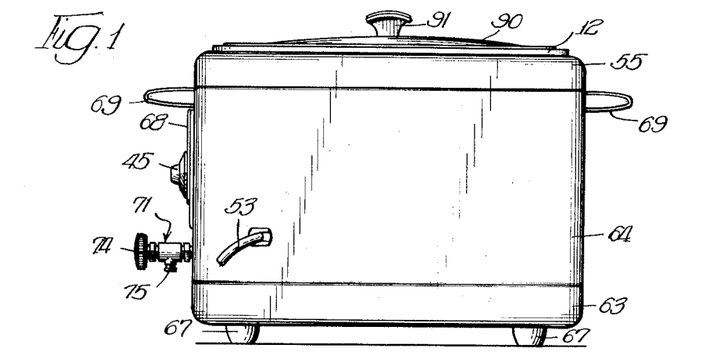
Fig. 1 is a side elevation of a cooking device embodying the invention.

The housing for the vessel shown in Fig. 1 comprises three stampings, a top member 55 drawn to have a vertical flange 56 rounded into a horizontal portion 57 which terminates around the vessel receiving opening 58 in an upwardly offset lip 59 received against the face 12b and behind the flange 12 on the vessel. This provides a very tight, liquid shedding assembly which is easy to keep clean. A bottom member 60 has a closed horizontally disposed central portion offset according to a pattern intended to reinforce it against "oil-canning," and apertured to receive screws 61 which engage in the threaded openings 23 on the vessel bosses 22. At its edges the bottom member is rounded into vertical flanges 63 of the same shape and dimensions as the flanges 56 thereabove.

The intermediate member 64 is a rectangularly-shaped housing member offset inwardly at its top and bottom edges to provide shoulders 66 and offsets 65 which telescope within the flanges 55 and 63 until the shoulders 66 come to rest against the edges of the flanges 56 and 63. Feet 67 are secured to the bottom member to support the assembly well above a table top so that the device can be used elsewhere than in a kitchen without marring or discoloring a table top, and handles 69 are provided at the ends for handling the device.

In the preferred embodiment shown in Fig. 11, the housing for the vessel comprises two stampings, a bottom member 60a having a closed horizontally disposed central portion offset according to a pattern intended to reinforce it against "oil-canning," an aperture to receive screws 61 which engage in the threaded openings 23 on the vessel bosses 22. At its edges the bottom member is rounded into vertical flanges 63.

The upper member 64a is a rectangularly shaped housing member offset inwardly at its top and bottom edges to provide shoulders 66a and offset 65a which telescope within the flange 63 and then the grooves 9 upon the vessel member 10a until the shoulders 66 come to rest against the edges of the flanges 12c and 63.

The wall 13 or 13a of the vessels also have a boss at the bottom thereof below the heater level which is threaded to receive a pipe nipple 70 extending outwardly through the corresponding wall of the intermediate housing member 64. A needle valve 71 is mounted upon the other end of the nipple and comprises a body member 72, a valve stem 73 threaded in the body, a handle 74 on the valve stem, and a drain nozzle 75. The valve compartment 76 and the stem are in axial alignment with the passage through the nipple so that if the passageway or valve ever becomes clogged it can be cleaned out by a straight brush or instrument, and visual inspection can determine whether such is accomplished. The nozzle is press fitted into a side opening disposed normal to the valve compartment, and if it becomes clogged it is accessible from both ends for cleaning purposes when the valve is removed.

The location of the valve drain below the heater level and on the wall 13 is where the current of convectively circulated cooling oil is downwardly and inwardly towards the center of the vessel. Thus solid particles in the fat are spread along the bottom of the vessel away from the outlet opening. Although the valve is restricted to a drainage capacity below that which would cause dislodgement of the solid particles towards the drain opening when draining, the drain opening is appreciably above the bottom at a rounded contour so that near the end of the draining operation when only a little fat is left in the bottom of the vessel, the vessel can be tipped gradually enough that the last few ounces of oil will flow towards the valve opening without carrying with them the solid particles, yet all but a few drops can be recovered, leaving the solid particles to be wiped out when the vessel is cleaned.

As already mentioned, the dial 45 is calibrated for temperature control, and appropriate indicia thereon is provided. The upper heat limit preferably is 450° F. in order to prevent the temperature reaching the "flash point" of any oils possibly used, and the calibration includes 200° F. so that water can be used in the device and kept just below the boiling point for such culinary operations as "hard boiling" or poaching eggs, etc. A decorative plate 68 supports the dial and closes an access opening 69 through the middle housing member provided for inspection of the thermostat.

Just above the dial, two openings 76 and a frosted glass pane 77 therebehind are provided in visual alignment with the glow coil 50, so that the user can tell at a glance when the heater is "on" or "off," thus providing visual evidence that the device is fully plugged in and operating, as well as the anticipating control effect already described. Also, when the glow goes out the first time after plugging in the device, the user can, without guessing or a timer, determine that the device is ready for cooking operations.

A wire screen basket 80 is provided for handling potatoes and other goods and is constructed in combination with the vessel so that it can be supported in two positions, one a cooking position in which it is submerged in the cooking oil and the other so that oil on the cooked articles will drain back into the vessel.

The screen-work upon the basket is conventional, having a wire frame 81 around the top and all mesh joints soldered as by dipping. Two reinforcing wires 82 run from one end of the basket to the other around the bottom. These ends are secured to the wire frame 81 as by soldering or welding.

At one end, and secured to the reinforcing wires and wire mesh, as disposed on the inside of the basket, is a plate 83 having two spaced ears 84 die stamped inwardly with their free marginal edges bent towards each other to provide included shoulders. A U-shaped wire handle 85 is provided for handling the basket and includes downwardly bent end portions 86 with the free ends 87 turned outwardly. The tension on the sides of the handle is such that they are normally urged towards each other so that the end portions 86 in the resting position of the handle elements are close enough together to pass through the space between the flanges 84 with the turned-out ends disposed below the flanges 84. A spacer 87 is slidably mounted upon the sides of the handle and when moved from the curved end towards the free ends it forces the free ends away from each other to engage under the flanges 84 and support the basket on the turned-out ends. When it is desired to release the handle from the basket, the spacer 87 is slid toward the curved end, releasing the bent portions so that they return to their normal positions close to each other to slip laterally outwardly through the space between the flanges.

The flanges 84 could be bent away from each other, the free ends of the handle correspondingly turned away from each other, and the same engagement can be operated in reverse, in which case the normal position of the sides of the handle would be away from each other and the spacer would draw the downwardly bent portion on the handle towards each other and under the flanges 84 when slid away from the curved end.

Near the bottom and upon the same end, but on the outside of the basket, another stamping 88 is rigidly secured to the wires 82 and is formed to have keystone-shaped edges receivable in the T-slot 24 upon the vessel wall. Thus when it is desired to have cooking oil drain from the cooked food, the basket is manually lifted and moved to bring the stamping 88 into the T-slot, whereupon the engagement thus established supports the basket in draining position above the fat in the vessel.

In the embodiment shown in Fig. 1, a die stamped cover member 90 is provided with the marginal edges 91 pressed upwardly and outwardly to nest on the upper flanged edges 12 of the vessel. The central portion is drawn to a dome shape for structural rigidity and for draining droplets of liquids collecting thereon back into the vessel along the sides. An ornate handle 91 is secured on the top thereof for manipulating the cover. In the embodiment shown in Fig. 11 the cover is made of transparent Pyrex which serves a dual function of retarding the escape of heat conductively through the cover and permitting a user to observe the progress of cooking without removing the cover and causing a resulting cooling.

In operation, the vessel is filled about half full with cold cooking oil, the line cord is plugged into a convenience outlet, and the dial is turned in clockwise direction from "off" position to the temperature setting prescribed by recipe. This closes the contacts 40 and carries the fixed contact to its critical position. The handle is attached as described to the basket and the basket made ready for use. Visual inspection through the holes 76 will indicate that the heater is in operation because the radiant glow employed for the thermostat can be seen also as light through the openings 76.

Within a few minutes the oil is melted and as its temperature rises the glow coil establishes an anticipating surplus of heat in the bimetal element of the thermostat. This increment of surplus or differential heat is substantially immediately acquired and remains constant when and as long as the glow coil is on, because the somewhat edgewise position of the bimetal to the glow coil restricts the effective heat absorption of the bimetal. The bimetal whose temperature is established thereby is above the temperature of other surrounding parts and, because of this, radiates a certain amount of the heat to them which is being absorbed by it from the glow coil. A balance point is reached where further absorption is balanced by radiation loss. Thereafter this increment of heat is maintained as a differential above the temperature of the vessel.

This temperature differential in the bimetal is directly related to the high heat present in the heater which high heat continues to be expended by the heater for a little while after it is shut off.

Then when the composite temperature of the thermostat reaches a predetermined point above the actual temperature immediately present in the vessel and the oil, it will open the circuit on the glow coil and the heater. The initial darkening of the glow coil will inform the user that the oil is ready for cooking and the heater will continue to expend heat and will run out of appreciable excess heat about the time the temperature of the heater and vessel equals or slightly exceeds the desired temperature. However, extra concentration of heat at the two corners and end wall where the heating unit is bent will continue a while longer to maintain convective circulation of cooled oil against the thermostat wall of the vessel.

Thus the thermostat wall is the first to begin to be cooled below a predetermined point. However, in the meantime, the bimetal is radiating more heat than it is absorbing after the glow coil cools and the slightest fall in temperature of the adjacent vessel wall will be enough to bring the thermostat to its contact closing limit, whereupon the contacts are closed, the heat is turned "on" and the glow coil again readies the bimetal again for the upper limit or next "cut-off."

This cycle will repeat itself again and again, maintaining the temperature of the fat within a couple of degrees of any desired temperature until the cooking operation is completed. If the basket is used in the cooking operation it is then raised and the keystone member 88 is engaged in the T-slot 24 for draining until ready for emptying or serving.

Presuming that it is desired to remove the oil, the device is set on an elevated shelf or support, a pan is placed under the valve nozzle 75 and the valve opened. The fat drains, leaving the solid residue, and the vessel is tilted enough to drain the remaining fat before it cools. Thereafter the residue can be removed with little loss of cooling oil, and the vessel is wiped clean ready for the next use.

It will be noted that no oil can drain down inside the housing where it might contact the glow coil or heater ends. The overlap arrangement at the upper edge of the vessel and the housing in both embodiments prevents this. This overlap engagement is maintained tight by the compressive force exerted by the vessel flange 12 downwardly and the upward force exerted and maintained by the screws 61. Moreover, it will be observed that moisture or oil collecting on the cover will drain to the edges before falling back into the vessel, thereby minimizing dangers of burns by sputtering oil.

Having thus described the invention and certain embodiments thereof, it will be readily apparent to those skilled in the art how the objects mentioned are accomplished and how various and further modifications and changes may be made without departing from the spirit of the invention, the scope of which is commensurate with the appended claims.

What is claimed is:

1. A device of the class described comprising a vessel having four walls and a bottom, a horizontally disposed flange around the upper edge terminating marginally in a downwardly extending lip having downwardly opening grooves therein bounded by a wall whose lower face defines a plane, a heating element embedded in a plurality of adjacent walls above the bottom, said walls being rounded inwardly around the heating element, a thermostat mounted upon a heater free wall on the outside thereof, a drain through said heater free wall below the level of said heater including a valve, a housing enclosing said vessel and thermostat including an upper member turned inwardly to form a vertical flange received in said grooves, and means secured to the bottom of the vessel for holding said flange and lower face under compression to seal the thermostat and outside of said vessel from ambient atmosphere.

2. A vessel for a deep fat fryer having a bottom and four walls converging towards the bottom, a unitary heating element embedded in three of said walls adjacent the bottom, an opening through the other wall below the level of the heating element, and an outwardly and downwardly turned flange at the top having a T-shaped slot at the top of the fourth wall draining back into the vessel.

3. A device of the class described comprising a vessel having four walls and a bottom, a horizontally disposed flange around the upper edge terminating marginally in a downwardly extending lip whose lower face defines a plane, a heating element embedded in a plurality of adjacent walls above the bottom, said walls being rounded inwardly around the heating element, a thermostat mounted upon a heater free wall on the outside thereof, a drain through said heater free wall below the level of said heater including a valve, a housing enclosing said vessel and thermostat including an upper member turned inwardly to form a flange, a portion of which defines a plane, said flange and lower face on the lip mating in sealed relationship, and means secured to the bottom of the vessel for holding said flange and lower face under compression to seal the thermostat and outside of said vessel from ambient atmosphere.

4. An electric deep fat fryer comprising an elongated rectangular cooking vessel for fat formed of a metal of high heat conductivity and having four vertical walls of cast thickness defining a deep cooking space within the top major portion of its depth with three of said walls extending inwardly along their bottom edges to form a well below said cooking space of less horizontal cross sectional area than the horizontal cross sectional area of said cooking space, a unitary electric heater embedded in the upper portion of the metal forming the sides of the well along said three walls and extending with continuity around the perimeter of said well to leave the middle of the well heater free, the ends of said heater terminating short of the fourth vertical wall to leave the fourth vertical wall free of said heater, and a thermostat for controlling the operation of said heater mounted on the outside of and in intimate heat exchange relationship with said fourth vertical wall.

5. An electric deep fat fryer comprising a deep cooking vessel for fat, which cooking vessel is rectangular in shape and is formed of a metal of high heat conductivity with cast metal thicknesses, a well formed in the bottom of said vessel of less horizontal cross sectional area than the cross sectional area of the major portion of the vessel, a unitary electric heater embedded in the vessel adjacent to the upper portion of the well and extending with continuity around three contiguous vertical sides of said rectangular vessel to leave the center of the well and the vertical wall of the fourth side of the vessel free of said heater, and a thermostat for controlling the operation of said heater mounted in intimate heat conducting relation on the vertical wall of said fourth side.

6. An electric deep fat fryer comprising a deep cooking vessel for fat, which cooking vessel is rectangular in shape and is formed of a metal of high heat conductivity with cast metal thicknesses, a well formed in the bottom of said vessel of less horizontal cross sectional area than the cross sectional area of the major portion of the vessel, a unitary electric heater embedded in the vessel adjacent to the upper portion of the well and extending with continuity around three contiguous vertical sides of said rectangular vessel to leave the center of the well and the vertical wall of the fourth side of the vessel free of said heater, and a thermostat for controlling the operation of said heater mounted in intimate heat conducting relation on the vertical wall of said fourth side, the ends of said heater extending downwardly to a point below said well.

7. An electric deep fat fryer comprising a cooking vessel for fat formed of a metal of high heat conductivity and having a vertical wall of cast thickness defining a deep cooking space within the top major portion of its depth and extending inwardly along a major portion of its bottom edge to form a well below said cooking space of less horizontal cross sectional area than the horizontal cross sectional area of said cooking space, a unitary electric heater embedded in the upper portion of the metal forming the well and extending with continuity around a major portion of the perimeter of said well to leave the middle of the well heater free, the ends of said heater terminating short of encompassing the well to leave a substantial but minor portion of the vertical vessel wall free of said heater opposite the mid-point of said heater, and a thermostat for controlling the operation of said heater mounted on the outside of and in intimate heat exchange relationship with said minor portion of the vertical wall.

8. An electric deep fat fryer comprising a cooking vessel for fat formed of a metal of high heat conductivity and having a vertical wall of cast thickness defining a deep cooking space within the top major portion of its depth and extending inwardly along a major portion of its bottom edge to form a well below said cooking space of less horizontal cross sectional area than the horizontal cross sectional area of said cooking space, said wall being of extra thickness at the perimeter of said well where the bottom edge of the vertical wall extends inwardly, a unitary electric heater embedded in said extra thick portion of the wall and extending with continuity around said perimeter of said well to leave the bottom of the well heater free, the ends of said heater terminating short of encompassing the well in downwardly extending end portions to leave a substantial but minor portion of the vessel wall heater free opposite the mid-point of said heater, and a thermostat for controlling the operation of said heater mounted on the outside of the vessel in intimate heat exchange relationship therewith on said minor portion of the vessel wall.

9. An electric deep fat fryer comprising a deep cooking vessel for fat, which cooking vessel is formed with a vertical wall of cast metal thicknesses of a metal of high heat conductivity, a well formed at the bottom of said vessel of less horizontal cross sectional area than the cross sectional area of the major portion of the vessel, a unitary electric heater embedded in the metal forming the upper portion of the well and extending with continuity around the perimeter of the well to leave the middle of the well heater free, the ends of said heater terminating short of encompassing the well to leave a substantial but minor portion of said vertical wall of the vessel free of said heater opposite the mid-point of said heater, and a thermostat for controlling the operation of said heater, said thermostat being mounted in intimate heat conducting relation with said vessel on said minor portion of said wall at a point across the middle of said well from said mid-point of the heater.

10. An electric deep fat fryer comprising a deep cooking vessel for fat, which cooking vessel is formed with a vertical wall of cast metal thickness and of a metal of high heat conductivity, a well formed at the bottom of said vessel of less horizontal cross sectional area than the cross sectional area of the major portion of the vessel, a unitary electric heater embedded in the metal forming the upper portion of the well and extending with continuity around the perimeter of the well to leave the middle of the well heater free, the ends of said heater terminating short of encompassing the well to leave a substantial but minor portion of said vertical wall of the vessel free of said heater opposite the mid-point of said heater, and a thermostat for controlling the operation of said heater, said thermostat being mounted in intimate heat conducting relation with said vessel on said minor portion of said wall at a point across the middle of said well from said mid-point of the heater, and said minor portion of the vertical wall and the heater free middle of the well being contiguous to each other and of substantially uniform thickness throughout.

11. An electric deep fat fryer comprising a cooking vessel formed of cast metal of high heat conductivity and having a heavy vertical wall defining a deep cooking space within the top major portion of its depth and with an extra mass of metal stock at the bottom thereof forming a well portion at the bottom of the vessel of less horizontal cross sectional area than the horizontal cross sectional area of the major portion of the vessel, a unitary electric heater embedded in the upper portion of said mass of metal stock and extending with continuity around a major portion of the perimeter of said well to leave the central portion of the well bottom heater free, the ends of said heater terminating short of encompassing the well to leave a substantial but minor portion of the vessel wall free of said heater, said heater being confined to the said mass of metal stock exclusive of the central portion of the bottom of the well and exclusive of said minor portion of the vessel wall, and a thermostat for controlling the heating operation of said heater mounted on the outside of and in intimate heat exchange relationship with said minor portion of the vessel wall at a point above the level of said well.

12. An electric deep fat fryer comprising a cast cooking vessel for fat formed of a metal of high heat conductivity and having a vertical wall defining a deep cooking space within the top major portion of its depth and being of extra thickness along a major portion of its bottom edge to form a well below said cooking space of less horizontal cross sectional area than the horizontal cross sectional area of said cooking space, a unitary electric heater embedded in the metal stock of extra thickness forming said well and extending with continuity around a major portion of the perimeter of said well to leave the middle of the well heater free, the ends of said heater terminating short of encompassing the well in downwardly extending terminals to leave a substantial but minor portion of the vertical wall free of said heater opposite the mid-point of said heater, a thermostat for controlling the operation of said heater mounted on the outside of said vessel in intimate heat exchange relationship with a wall portion thereof which is free of said heater, said thermostat comprising a switch connected in series with the heater and a bimetal member controlling said switch mounted at one end in metal to metal heat conducting relationship with such wall portion and the remainder of said bimetal member exposed to heat radiated to it from such wall, and a housing protecting the thermostat and the outside of the vessel from ambient atmosphere.

13. An electric deep fat fryer comprising a cooking vessel for fat formed of a metal of high heat conductivity and having a vertical wall of cast thickness defining a deep cooking space within the top major portion of its depth and extending inwardly along a major portion of its bottom edge to form a well below said cooking space of less horizontal cross sectional area than the horizontal cross sectional area of said cooking space, said wall being of extra thickness at the perimeter of said well where the bottom edge of the vertical wall extends inwardly, a unitary electric heater embedded in said extra thick portion of the wall and extending with continuity around said perimeter of said well to leave the bottom of the well heater free, the lowest point in the well being below the level of said heater and the ends of said heater terminating short of encompassing the well in downwardly extending end portions to leave a substantial but minor portion of the vessel wall free of said heater opposite the mid-point of said heater, a thermostat for controlling the operation of said heater mounted on the outside of the vessel in intimate heat exchange relationship therewith on said minor portion of the vessel wall, and a housing enclosing the thermostat and all of the vessel but the top thereof to protect the vessel and thermostat from ambient atmosphere.

14. An electric deep fat fryer comprising a cooking vessel for fat formed of a metal of high heat conductivity and having a vertical wall of cast thickness defining a deep cooking space for heated fat within the top major portion of its depth and a bottom wall of less horizontal area than the horizontal cross sectional area of said cooking space, said walls being thicker at the perimeter of said bottom wall defining a central well space for comparatively cool fat below said cooking space, a unitary electric heater embedded in said thick portion of the wall below said cooking space and extending with continuity around the perimeter of said bottom wall to leave the bottom wall heater free, the ends of said heater terminating short of encompassing the bottom wall in downwardly extending end portions to leave a substantial but minor portion of the vessel wall free of said heater, said walls which are free of said heater joining in one continuous wall section of the vessel which is free of said heater, a thermostat for controlling the operation of said heater mounted on the outside of the vessel in intimate heat exchange relationship therewith on said wall section below the normal level of fat in the vessel, and an ornamental casing completely surrounding all but the top of the vessel for enclosing said vessel and thermostat in an insulating air space between said vessel and housing protected from ambient atmosphere.

15. An electric deep fat fryer comprising a cooking vessel for fat formed of a metal of high heat conductivity and having a vertical wall of cast thickness defining a deep cooking space within the top major portion of its depth and extending inwardly along a major portion of its bottom edge to form a well below said cooking space of less horizontal cross sectional area than the horizontal cross sectional area of said cooking space, said wall being thicker at the perimeter of said well where the bottom edge of the vertical wall extends inwardly, a unitary electric heater embedded in said thick portion of the wall and extending with continuity around said perimeter of said well to leave the bottom of the well heater free, the ends of said heater terminating short of encompassing the well to leave a substantial but minor portion of the vessel wall free of said heater, a thermostat for controlling the operation of said heater mounted on the outside of the vessel in intimate heat exchange relationship therewith on said minor portion of the wall, a glow coil mounted proximate to said thermostat for radiating heat to the thermostat, said glow coil and heater being connected and arranged to operate simultaneously, an ornamental casing completely surrounding all but the top of the vessel for enclosing said vessel, glow coil and thermostat in an insulating air space between said vessel and housing protected from ambient atmosphere.

16. A device of the class described comprising a vessel formed of a thick metal of high heat conductivity and having a vertical wall defining a deep cooking space within the top major portion of its depth and extending inwardly along the major portion of its bottom edge to form a well below said cooking space of less horizontal cross sectional area than the horizontal cross sectional area of the cooking space, a horizontally disposed flange around the upper edge of the vertical wall terminating marginally in a downwardly facing edge whose lower surface defines a plane, a unitary heater embedded in the upper portion of the metal forming the well and extending with continuity around a major portion of the perimeter of said wall to leave the middle of the well heater free, the ends of said heater terminating short of encompassing said wall to leave a substantial but minor portion of the vertical wall free of said heater, the remaining portion of said vertical wall being heater free between said flange and the metal forming the well, a thermostat mounted on the outside of a said minor portion of the vertical wall in heat exchange relationship therewith, a housing enclosing said vessel and thermostat including an upper member turned inwardly along its upper edge to form a flange received against said lower surface of said first flange with the edge of the second flange nesting against the vessel to support the housing against inward pressures in handling, and means secured to the bottom of the vessel for holding said second flange and said lower surface of the first flange under compression to seal the thermostat and the outside of said vessel from ambient atmosphere.

17. An electric deep fat fryer comprising a cooking vessel for fat formed of a metal of high heat conductivity and having a vertical wall of cast thickness defining a deep cooking space within the top major portion of its depth and extending inwardly along a major portion of its bottom edge to a bottom wall to form a well below said cooking space of less horizontal cross sectional area than the horizontal cross sectional area of said cooking space, a unitary electric heater embedded in the upper portion of the metal forming the well and extending with continuity around a major portion of the perimeter of said well to leave the middle of the bottom wall heater free, the ends of said heater terminating short of encompassing the well to leave a substantial but minor portion of the vertical vessel wall free of said heater opposite the mid-point of said heater, a thermostat for controlling the operation of said heater mounted on the outside of and in intimate heat exchange relationship with a wall portion free of said heater, and a drain through said minor portion of the vertical wall above the bottom of said well including a valve having a threaded opening, said valve comprising a valve stem received in said threaded opening, a valve chamber and a valve port passageway, said opening, chamber and passageway being disposed in axial alignment with one another and said well.

18. An electric deep fat fryer comprising a cooking vessel for fat formed of a thick metal of high heat conductivity and having a vertical wall defining a deep cooking space for heated fat within the top major portion of its depth and a bottom wall of less horizontal area than the horizontal cross sectional area of said cooking space, said vertical wall rounding inwardly to define a central well space for fat below said cooking space, a unitary electric heater embedded in the metal of the vessel below said cooking space and extending with continuity around the perimeter of said well to leave the bottom wall heater free in the center thereof, the ends of said heater terminating short of encompassing the well in downwardly extending end portions to leave a substantial portion of the vertical wall on that side of the vessel free of said heater, a thermostat for controlling the operation of said heater mounted on the outside of and in intimate heat exchange relationship with said substantial portion of the vessel wall below the normal level of fat in the vessel, and an ornamental casing completely surrounding all but the top of the vessel for protecting said vessel and thermostat from ambient atmosphere, and a drain through the vertical wall of the vessel and through the casing above said bottom wall including a valve having a threaded opening, said valve comprising a valve stem received in the threaded opening, a valve chamber around the valve stem and a valve port passageway, said opening, chamber, and passageway being disposed in axial alignment to afford rectilineal access to the interior of the vessel through said opening, chamber and passageway when the valve stem is removed.

19. In a deep fat fryer the combination of a rectangular cooking vessel made of die cast metal having a unitary electric U-shaped heater embedded therein around the bottom of three vertical side walls of the vessel to form a well in the bottom of a horizontal cross sectional area less than the horizontal cross sectional area of the major portion of the cooking space in the vessel above the heater, said heater extending with continuity around the perimeter of said well to leave heater free the middle of the bottom wall of the well, the ends of said heater terminating short of the fourth vertical side wall to leave the fourth wall free of said heater, an outwardly extending flange around the top of the vessel having a lower face defining a sealing surface, a plurality of bosses on the vessel including a depending boss on the bottom wall, a thermostat mounted on the outside of said fourth wall above the level of the heater including a switch connected in series with said heater and a bimetal element controlling said switch spaced from the wall with the plane thereof disposed crosswise to the direction of heat radiation from the wall, a housing for said vessel, means inter-engaging said housing and depending boss to establish a compressive seal between said housing and vessel at said surface to seal the thermostat and the outside of said vessel from hot fat drippings and ambient atmosphere, a basket receivable in said vessel to a depth approximately the level of the top of said well to permit fat to circulate through the well below said basket.

20. In a device of the class described, a vessel body having an electric heating device embedded in less than all the walls thereof at their bottom, a mounting plate secured on a wall without the heating device therein and having a window therethrough, a thermostat secured on the mounting plate and having a bimetal member disposed outside the window with the plane thereof crosswise to the direction of heat radiation from said wall through the window, a glow coil connected electrically in series with said heating device mounted near an edge of said bimetal member and approximately within said plane, a switch controlled by said thermostat, means connecting the switch, glow coil and heating device electrically in series, and a housing enclosing said vessel, thermostat and glow coil to protect them from ambient atmosphere and having a translucent window disposed opposite said glow coil.

RAYMOND J. BRASKI.
FRED C. SCHWANEKE.

REFERENCES CITED

The following references are of record in the file of this patent:

UNITED STATES PATENTS

| Number | Name | Date |
|---|---|---|
| 1,046,888 | Stanley | Dec. 10, 1912 |
| 1,990,351 | Shroyer | Feb. 5, 1935 |
| 2,062,721 | Lerouge | Dec. 1, 1936 |
| 2,128,738 | Blake | Aug. 30, 1938 |
| 2,134,675 | Shroyer | Oct. 25, 1938 |
| 2,196,968 | Bemis | Apr. 16, 1940 |
| 2,305,084 | Johnson | Dec. 15, 1942 |
| 2,314,467 | Tubbs | Mar. 23, 1943 |
| 2,593,392 | Budlane | Apr. 15, 1952 |